US011694364B2

(12) United States Patent
Steenhoek et al.

(10) Patent No.: US 11,694,364 B2
(45) Date of Patent: Jul. 4, 2023

(54) SYSTEMS AND METHODS FOR APPROXIMATING A 5-ANGLE COLOR DIFFERENCE MODEL

(71) Applicant: AXALTA COATING SYSTEMS IP CO., LLC, Wilmington, DE (US)

(72) Inventors: Larry E. Steenhoek, Wilmington, DE (US); Dominic V. Poerio, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 518 days.

(21) Appl. No.: 17/022,561

(22) Filed: Sep. 16, 2020

(65) Prior Publication Data

US 2021/0089920 A1  Mar. 25, 2021

Related U.S. Application Data

(60) Provisional application No. 62/903,072, filed on Sep. 20, 2019.

(51) Int. Cl.
*G06T 7/90* (2017.01)
*G01J 3/46* (2006.01)

(52) U.S. Cl.
CPC .............. *G06T 7/90* (2017.01); *G01J 3/462* (2013.01); *G01J 3/465* (2013.01); *G01J 2003/466* (2013.01)

(58) Field of Classification Search
CPC ... G06T 7/90; G01J 3/462; G01J 3/465; G01J 2003/466

(Continued)

(56) References Cited

U.S. PATENT DOCUMENTS

2008/0235224 A1*  9/2008 Joseph Rodrigues ... B05D 5/06
2017/0328774 A1   11/2017 Vignolo et al.
(Continued)

FOREIGN PATENT DOCUMENTS

WO   WO-2011062600 A1 *  5/2011  ............. C08G 63/88
WO   2013049796 A1      4/2013
WO   WO-2018217867 A1 * 11/2018  ............. B05D 5/065

OTHER PUBLICATIONS

Melgosa, et al., Measuring color differences in automotive samples with lightness flop: A test of the AUDI2000 color-difference formula, Optics Express, Feb. 2014, vol. 22, Issue 3, pp. 3458-3467.

*Primary Examiner* — Gabriel I Garcia
(74) *Attorney, Agent, or Firm* — Lorenz & Kopf, LLP

(57) ABSTRACT

Apparatuses and methods for approximating a 5-angle color difference model are provided, where the 5-angle color difference model utilizes a 5-angle equation. In an exemplary embodiment, an apparatus includes a storage device for storing instructions and one or more processors configured to execute the instructions. The processor(s) are configured to receive 3-angle standard and test color measurements, and enter the 3-angle standard measurement into a neural network empirical model. The neural network empirical model includes a plurality of input nodes, a plurality of hidden nodes connected to the input nodes, and a plurality of output nodes connected to the hidden nodes. The neural network empirical model is configured to output 3-angle tolerance values, and to calculate a 3-angle color difference value using the 5-angle equation for at least one of the 3 color measurement angles using the 3-angle standard and test color measurements and the 3-angle tolerance values.

20 Claims, 6 Drawing Sheets

(58) Field of Classification Search
USPC .......................................................... 382/162
See application file for complete search history.

(56) References Cited

U.S. PATENT DOCUMENTS

2018/0011225 A1\* 1/2018 Bellman .................. G02B 1/14
2020/0096390 A1\* 3/2020 Supèr ................... G01N 21/255

\* cited by examiner

15°, 45°, 110°

| Variable | Data Set | Mean | StDev | Q1 | Median | Q3 | Maximum |
|---|---|---|---|---|---|---|---|
| Abs Delta SdL(15) | TRN | 0.0274 | 0.0225 | 0.0102 | 0.0230 | 0.0386 | 0.1754 |
| | VAL | 0.0285 | 0.0234 | 0.0113 | 0.0238 | 0.0402 | 0.2146 |
| Abs Delta SdC(15) | TRN | 0.0502 | 0.0520 | 0.0153 | 0.0357 | 0.0688 | 0.7109 |
| | VAL | 0.0538 | 0.0609 | 0.0152 | 0.0363 | 0.0710 | 1.0815 |
| Abs Delta SdH(15) | TRN | 0.0271 | 0.0281 | 0.0083 | 0.0194 | 0.0369 | 0.3827 |
| | VAL | 0.0291 | 0.0330 | 0.0082 | 0.0196 | 0.0384 | 0.5870 |
| Abs Delta SdL(45) | TRN | 0.0113 | 0.0105 | 0.0040 | 0.0093 | 0.0154 | 0.1135 |
| | VAL | 0.0116 | 0.0102 | 0.0043 | 0.0095 | 0.0159 | 0.0917 |
| Abs Delta SdC(45) | TRN | 0.0247 | 0.0262 | 0.0080 | 0.0179 | 0.0320 | 0.2218 |
| | VAL | 0.0266 | 0.0299 | 0.0084 | 0.0193 | 0.0349 | 0.4989 |
| Abs Delta SdH(45) | TRN | 0.0131 | 0.0141 | 0.0041 | 0.0091 | 0.0170 | 0.1214 |
| | VAL | 0.0141 | 0.0161 | 0.0041 | 0.0101 | 0.0189 | 0.2708 |
| Abs Delta SdL(110) | TRN | 0.0040 | 0.0035 | 0.0013 | 0.0031 | 0.0058 | 0.0249 |
| | VAL | 0.0043 | 0.0038 | 0.0014 | 0.0034 | 0.0062 | 0.0466 |
| Abs Delta SdC(110) | TRN | 0.0077 | 0.0075 | 0.0025 | 0.0059 | 0.0101 | 0.0693 |
| | VAL | 0.0080 | 0.0082 | 0.0027 | 0.0061 | 0.0107 | 0.1728 |
| Abs Delta SdH(110) | TRN | 0.0038 | 0.0036 | 0.0013 | 0.0028 | 0.0052 | 0.0324 |
| | VAL | 0.0040 | 0.0037 | 0.0014 | 0.0029 | 0.0054 | 0.0319 |

| Variable | Data Set | Mean | StDev | Q1 | Median | Q3 | Maximum |
|---|---|---|---|---|---|---|---|
| Abs Delta SdL(25) | TRN | 0.0121 | 0.01067 | 0.0044 | 0.0093 | 0.0172 | 0.0716 |
| | VAL | 0.0134 | 0.01201 | 0.0046 | 0.0100 | 0.0186 | 0.0763 |
| Abs Delta SdC(25) | TRN | 0.0122 | 0.01528 | 0.0038 | 0.0074 | 0.0145 | 0.2832 |
| | VAL | 0.0123 | 0.01657 | 0.0037 | 0.0074 | 0.0148 | 0.3591 |
| Abs Delta SdH(25) | TRN | 0.0070 | 0.01610 | 0.0012 | 0.0028 | 0.0057 | 0.2816 |
| | VAL | 0.0073 | 0.01753 | 0.0013 | 0.0028 | 0.0056 | 0.2767 |
| Abs Delta SdL(45) | TRN | 0.0112 | 0.01000 | 0.0042 | 0.0087 | 0.0153 | 0.0978 |
| | VAL | 0.0115 | 0.01023 | 0.0040 | 0.0091 | 0.0157 | 0.0955 |
| Abs Delta SdC(45) | TRN | 0.0165 | 0.01495 | 0.0057 | 0.0126 | 0.0231 | 0.1823 |
| | VAL | 0.0161 | 0.01473 | 0.0054 | 0.0122 | 0.0220 | 0.1867 |
| Abs Delta SdH(45) | TRN | 0.0064 | 0.00558 | 0.0024 | 0.0050 | 0.0089 | 0.0605 |
| | VAL | 0.0063 | 0.00538 | 0.0023 | 0.0049 | 0.0089 | 0.0336 |
| Abs Delta SdL(110) | TRN | 0.0049 | 0.00419 | 0.0016 | 0.0038 | 0.0069 | 0.0257 |
| | VAL | 0.0053 | 0.00461 | 0.0019 | 0.0040 | 0.0074 | 0.0523 |
| Abs Delta SdC(110) | TRN | 0.0103 | 0.01146 | 0.0029 | 0.0067 | 0.0131 | 0.1290 |
| | VAL | 0.0103 | 0.01139 | 0.0030 | 0.0067 | 0.0132 | 0.1349 |
| Abs Delta SdH(110) | TRN | 0.0031 | 0.00272 | 0.0011 | 0.0024 | 0.0043 | 0.0323 |
| | VAL | 0.0030 | 0.00257 | 0.0011 | 0.0023 | 0.0041 | 0.0219 |

FIG. 6

SYSTEMS AND METHODS FOR APPROXIMATING A 5-ANGLE COLOR DIFFERENCE MODEL

CROSS-REFERENCE TO RELATED APPLICATION

This application claims the benefit of U.S. Provisional Application No. 62/903,072, filed Sep. 20, 2019 which is hereby incorporated in its entirety by reference.

TECHNICAL FIELD

The technical field is directed to coatings technology and more particularly to systems and methods for approximating a 5-angle color difference model based on 3-angle color measurements.

BACKGROUND

Automobiles, vehicles, and other items are typically coated with paint to provide protection from corrosion, and to provide an attractive appearance. However, different batches of a coating may have slightly different coloration. Changing the batch during a coating operation can result in mis-matched area on the substrate. However, discarding a partial batch of coating because of mis-match concerns is wasteful. Also, different production facilities may produce products with slightly different coloration. As such, techniques for determining the difference in similar coatings or colors provides a benefit to producers and consumers.

Quantification of the difference between different coatings can aid an OEM manufacturer or a refinish operation in providing an accurate color matching operation. In one embodiment, a 5-angle color difference model has been developed that is generally accepted as providing a reasonable and consistent quantification of color differences between two coatings at the measured angles. This 5-angle color difference model may be referred to as the "AUDI® 2000 Color Difference Equation." The color difference between two coatings often depends on the viewing angle, so a coating that may be essentially identical at one viewing angle may have noticeable distinctions at a different viewing angle. This color difference is especially noticeable if the coating has effect pigments or "depth." The 5-angle color difference model uses 5 different angles to capture the apparent color differences at the 5 different angles. Some aspects of the 5-angle color difference model utilize measured color properties at different angles, so the results depend on the measurements from other angles. However, even if the 5-angle color difference model is not a perfect predictor of color difference at all angles, it does provide a consistent and repeatable measure of color difference that can be accepted and utilized by interested entities.

Some coating manufacturers provide color measurement devices that utilize 3-angles, so the 5-angle color difference model cannot be properly implemented. Three angle color difference calculation may provide different results than those from a 5-angle color difference calculation, even if the same viewing angle is utilized, because certain aspects of the 5-angle color difference model use other angles that may not be included in the 3-angle model. For example, for a single standard sample (referred to herein as a "standard coat" or a "standard color") coat and test sample (referred to herein as a "test coat" or a "test color"), the color difference value from the AUDI® 2000 Color Difference 5-angle equation at 15° (where the 5-angles are 15°, 25°, 45°, 75°, and 110°) would be different than for a 3-angle difference calculation of the same standard coat and test coat at 15° (where the 3-angles are 15°, 45°, and 110°). This lack of consistent results for the same standard coat, the same test coat, and the same measurement angle makes it difficult to compare coatings from different manufactures that utilize different numbers of color measurement angles.

As such, it is desirable to provide a system and a method for approximating the 5-angle color difference model using a 3-angle color measurement system. Imperfections in the 5-angle color difference model should be repeatable within a new model that uses 3-angle color measurements, so use of both a 3-angle color measurement tool and a 5-angle color measurement tool could be used with consistent color difference value estimates for the same standard color, test color, and measurement angle. In addition, other desirable features and characteristics will become apparent from the subsequent summary and detailed description, and the appended claims, taken in conjunction with the accompanying drawings and this background.

SUMMARY

Apparatuses and methods for approximating a 5-angle color difference model are provided, where the 5-angle color difference model utilizes a 5-angle equation. In an exemplary embodiment, an apparatus includes a storage device for storing instructions and one or more processors configured to execute the instructions. The processor(s) are configured to receive 3-angle standard and test color measurements, and enter one of (i) the 3-angle standard measurement, or (ii) a geometric mean of a lightness and a chroma of the standard and test color measurements into a neural network empirical model. The neural network empirical model includes a plurality of input nodes, a plurality of hidden nodes connected to the input nodes, and a plurality of output nodes connected to the hidden nodes. The neural network empirical model is configured to output 3-angle tolerance values, and to calculate a 3-angle color difference value using the 5-angle equation for at least one of the 3 color measurement angles using the 3-angle standard and test color measurements and the 3-angle tolerance values.

A method of approximating a 5-angle color difference model with 3-angle measurement data is provided in another embodiment. The method includes receiving 3-angle standard and test color measurements at each of 3 color measurement angles, and entering one of (i) the 3-angle standard color measurement or (ii) a geometric mean of a lightness and a chroma of the standard and test color measurements into a neural network empirical model. The neural network empirical model includes a plurality of input nodes, a plurality of hidden nodes connected to the plurality of input nodes, and a plurality of output nodes connected to the hidden nodes. The neural network empirical model outputs 3-angle tolerance values for each of the 3 color measurement angles, and calculates a 3-angle color difference value for at least one of the 3 color measurement angles. The neural network empirical model uses a 5-angle equation that is the same as that used by the 5-angle color difference model, except the 3-angle tolerance values are used in place of 5-angle tolerance values typically used by the 5-angle equation.

A method of producing a 3-angle color difference model that approximates a 5-angle color difference model is provided in yet another embodiment. The method includes receiving a 5-angle standard color measurement of a standard color at each of 5 color measurement angles, and calculating a plurality of 5-angle tolerance values. 3-angle standard color measurements of the standard color are received at each of 3 color measurement angles, where the 3 color measurement angles are a subset of the 5 color measurement angles. A neural network empirical model is produced that includes a plurality of input nodes, a plurality of hidden nodes connected to the plurality of input nodes, and a plurality of output nodes connected to the plurality of hidden nodes, where the neural network empirical model is configured to output 3-angle tolerance value at each of the 3 color measurement angles. The neural network empirical model is trained with (1) the 5-angle standard color measurement, (2) the 3-angle standard color measurement, and (3) the 5-angle tolerance values such that the 3-angle tolerance values output by the neural network empirical model are about the same as the 5-angle tolerance values at each of the 3 color measurement angles.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 3 is a table summarizing training data and validation data for an exemplary neural network empirical model using color measurement angles of 15°, 45°, and 110°;

FIG. 6 is a table summarizing training data and validation data for an exemplary neural network empirical model using color measurement angles of 25°, 45°, and 110°

DETAILED DESCRIPTION

Figure 1:
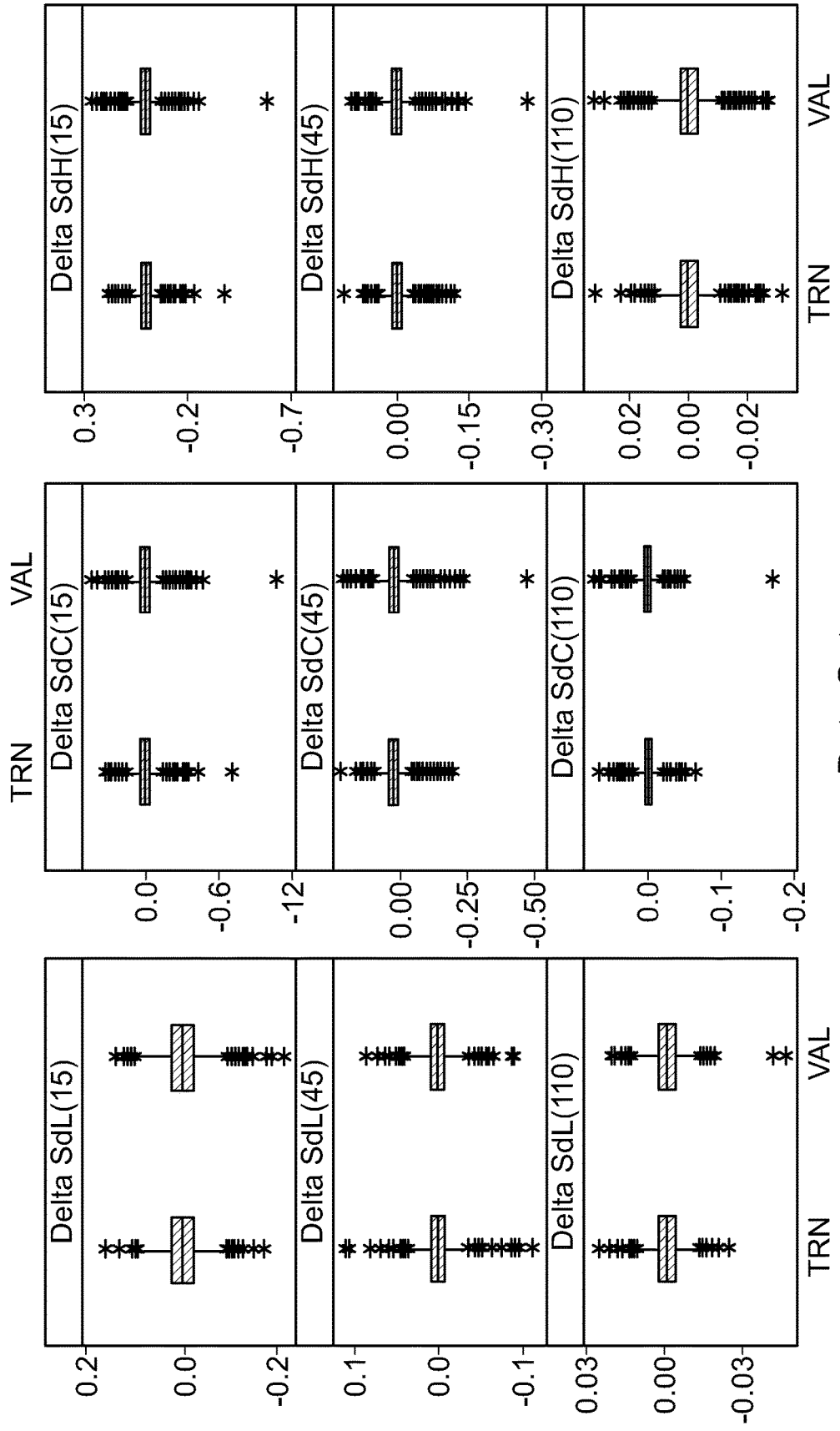
FIG. 1 is boxplot of training data and validation data for an exemplary neural network empirical model using color measurement angles of 15°, 45°, and 110°.

The following detailed description is not intended to limit this description or the application and uses thereof. Furthermore, there is no intention to be bound by any theory presented in the preceding background or the following detailed description. It should be understood that throughout the drawings, corresponding reference numerals indicate like or corresponding parts and features.

The features and advantages identified in the present disclosure will be more readily understood by those of ordinary skill in the art from reading the following detailed description. It is to be appreciated that certain features, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

To those skilled in the art, it is understood that bias nodes may be present in any layer except the output layer. As such, if bias nodes are not expressly stated or shown, it is understood they may be present in any or all layers other than the output layer.

Techniques and technologies may be described herein in terms of functional and/or logical block components, and with reference to symbolic representations of operations, and functions that may be performed by various computing components or devices. In practice, one or more data processors can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together or being "connected." As used herein, unless expressly stated otherwise, "coupled" and/or "connected" means that one element/node/feature is directly or indirectly joined to (or directly or indirectly communicates with) another element/node/feature, and not necessarily mechanically. Thus, although one example of an arrangement of elements may be described, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, touchscreen displays, and other functional aspects of certain systems and subsystems (and the individual operating components thereof) may not be described in detail herein. Furthermore, the connecting lines are intended to represent an example of functional relationships and/or physical couplings between the various elements. It should be noted that many alternative or additional functional relationships or physical connections may be present in an embodiment of the subject matter.

As used herein, the term "module" and/or "node" refers to any hardware, software, firmware, electronic control component, processing logic, and/or data processor, individually or in any combination, including without limitation: application specific integrated circuit (ASIC), an electronic circuit, a data processor (shared, dedicated, or group) and memory that executes one or more software or firmware programs, a combinational logic circuit, and/or other suitable components that provide the described functionality.

The term "color data" or "color characteristics" of a coating can comprise measured color data including spectral reflectance values; X,Y,Z values; L*, a*, b* values where L* indicates lightness, a* indicates color from green (−) to red (+), and b* indicates color from blue (−) to yellow (+); L*,C*,h* values where L* indicates lightness, C* indicates chroma, and h* indicates hue; a flop index; or a combination thereof. Color data can further include a color code of a vehicle, a color name or description, or a combination thereof. Color data can even further include visual aspects of color of the coating, chroma, hue, lightness or darkness. The color data can be obtained by visual inspection, or by using a color measurement device such as a colorimeter, a spectrophotometer, or a goniospectrophotometer. In particular, spectrophotometers obtain color data by determining the amount of light reflected at each wavelength by a coating layer. The color data can also include descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by a color-appearance dual measuring device.

A processor-implemented system for approximating a 5-angle color difference model is provided. The 5-angle color difference model includes a 5-angle equation, wherein the 5-angle equation is:

$$d E_{\Upsilon i} = \text{the square root of } ((dL^*_{\Upsilon i}/k_L \cdot S_{5L,\Upsilon i})^2 + (dC^*_{\Upsilon i}/k_C \cdot S_{5C,\Upsilon i})^2 + (dH^*_{\Upsilon i}/k_H \cdot S_{5H,\Upsilon i})^2); \quad (A)$$

wherein: $dE_{\Upsilon i}$ is a 5-angle color difference value at a given angle $\Upsilon$; $dL^*$ is a difference in a color lightness between a standard color–test color pair; $\Upsilon$ is a color measurement angle, or the angle at which a color measurement is performed, where $\Upsilon$ includes 5-angles in an exemplary embodiment; i is an iteration of the measurement angle, such as the first color measurement angle, the second color measurement angle, etc.; $dC^*$ is a difference in color chroma between the standard color–test color pair; $dH^*$ is a difference in hue between the standard color–test color pair; $K_L$, $K_C$, and $K_H$ are acceptance limits, which may be constants such as 1 for each K value in an exemplary embodiment; and $S_{5L}$, $S_{5C}$, and $S_{5H}$ are 5-angle tolerance values for the color lightness, color chroma, and color hue, respectively at a particular color measurement angle (i.e., a particular $\Upsilon$). In an exemplary embodiment, the 5-angle equation is the AUDI® 2000 Color Difference 5-angle equation, but other 5-angle equations could be approximated in alternate embodiments. This 5-angle equation could be solved for any number of angles, i.e. so the value of "i" can iterate from 1 to any desired whole number, but is typically used with 5 discrete angles. As such, the 5-angle equation could be solved for 3-angles, where the value of "i" iterates from 1 to 2 and then to a final value of 3. The results of the 5-angle equation when only using 3-angles is referred to herein as the 3-angle color difference value. As the number of angles utilized in the equation changes, the results from the equation typically change as well.

The 5-angle tolerance values are calculated for use in the 5-angle equation. In an exemplary embodiment, the AUDI® 2000 Color Difference 5-angle equation uses the equations below to calculate the 5-angle tolerance values.

$$S_{5L\Upsilon i} = 1.000 \cdot ((|L^*_{\Upsilon i} - L^*_{\Upsilon i+1}|)/(\Upsilon_{i+1} - \Upsilon_i))^{2/3} + 0.002 \cdot C^*_{45} + 0.33 \quad (B)$$

$$S_{5C\Upsilon i} = 1.478 \cdot ((|C^*_{\Upsilon i} - C^*_{\Upsilon i+1}|)/(\Upsilon_{i+1} - \Upsilon_i)) + 0.014 \cdot C^*_{45} + 0.27 \quad (C)$$

$$S_{5H\Upsilon i} = 0.800 \cdot ((|C^*_{\Upsilon i} - C^*_{\Upsilon i+1}|)/(\Upsilon_{i+1} - \Upsilon_i)) + 0.004 \cdot C^*_{45} + 0.30 \quad (D)$$

where the symbols previously described have the meanings listed above, where $L^*$ and $C^*$ are the lightness and chroma of the standard color, and where $C^*_{45}$ is the chroma of the standard color measured at 45°. In general, the standard color is the color that is being used as a reference. If neither color is identifiable as the standard color, an average value is used in equations (B), (C), and (D) above. In particular, if on standard color can be identified as the reference color, the values used in equations (B), (C), and (D) for $L^*$ and $C^*$ are a geometric mean of the lightness and chroma of the two colors at the selected measurement angle, and $C^*_{45}$ is the geometric mean of the chroma of the two colors at the 45° angle. In this description, the two colors are referred to as the "standard" and "test" colors in all cases, so if neither color is clearly the reference color, then one of the colors is randomly referred to as the "standard" color and the other is referred to as the "test" color, but the geometric mean of the $L^*$ and $C^*$ values of the two colors at the selected measurement angle are used in equations (B), (C), and (D). The values for each of $k_L$, $k_C$, and $k_H$ in the 5-angle AUDI® 2000 Color Difference Equation is 1. The $k_L$, $k_C$, and $k_H$ terms are parametric factors that permit independent weighting of the $d_L^*$, $d_C^*$, and $d_H^*$ values described above.

As an example, for a 5-angle system using 15°, 25°, 45°, 75°, and 110°, the 5-angle tolerance value for chroma at 15° would be:

$$S_{C15} = 1.478 \cdot ((|C^*_{15} - C^*_{25}|)/(25-15)) + 0.014 \cdot C_{45} + 0.27.$$

As can be seen, the 5-angle tolerance values depend on the color measurement angle ($\Upsilon$), as well as on the next iteration of the color measurement angle ($\Upsilon$ +1). Therefore, a three angle system that uses 15°, 45°. and 110° has no chroma value at 25°. As such, this exemplary 3-angle system produces a 3-angle tolerance value for chroma at 15° that is different than the 5-angle tolerance value for chroma at 15°. This means the same color measurement values for the same standard color–test color pair at 15° produces different results for the 3-angle color difference value and the 5-angle color difference value. However, a technique for generating a 3-angle tolerance value that is about the same as the 5-angle tolerance value as calculated above is described herein, where this technique produces consistent results for 3-angle and 5-angle color data in the AUDI® 2000 5-angle color difference model.

The processor-implemented system includes a storage device for storing instructions for approximating the 5-angle color difference model, and for storing instructions for approximating the results of the 5-angle color difference model using 3-angle color measurement values. The system further includes one or more data processors configured to execute the instructions to (1) receive a 3-angle standard color measurement of a standard color at each of 3 color measurement angles, (2) receive a 3-angle test color measurement for a test color at each of the 3 color measurement angles, (3) enter the 3-angle standard color measurements into a neural network empirical model comprising a plurality of input nodes, a plurality of hidden nodes, and a plurality of output nodes, wherein the neural network empirical model is configured to output 3-angle tolerance values $S_{3L}$, $S_{3C}$, and $S_{3H}$ at each of the 3-angle measurement points; and optionally (4) calculate a 3-angle color difference value using equation (A) with the 3-angle standard color measurements, the 3-angle test color measurements, and where the 3-angle tolerance values are used in place of the 5-angle tolerance values.

The system may include an input device for receiving the 3-angle color measurements, and optionally for receiving the 5-angle color measurements and/or the 5-angle color difference values and/or the 5-angle tolerance values. Other data or information may also be input using the input device. The input device can be selected from a digital input device, such as a wired keyboard, a wireless keyboard, a digital writing pad, a touch screen, an input portal that can be connected to an electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the one or more input device(s) may further require necessary adaptors or couplings in order to input data into the data processor, wherein those adaptors or couplings can be readily determined by those skilled in the art. Those adaptors or couplings can further be wired or wireless.

The system may optionally include a display. The display can be selected from a digital display device, such as a computer monitor, a PDA, a computer, a cell phone, a smart phone, a tablet computer, or a TV; an optical display device, such as a projector; a print display, such as a printer; other display devices, or a combination thereof. The display can also be a dual functional display/data input device. One example of such dual functional device is a touch screen of a computer, a smart phone, a tablet computer, or a PDA.

A neural network empirical model is used to calculate 3-angle tolerance values, i.e., $S_{3L}$, $S_{3C}$, and $S_{3H}$, where the 3-angle tolerance values $S_{3L}$, $S_{3C}$, and $S_{3H}$ are substituted into the 5-angle equation in place of the 5-angle tolerance values $S_{5L}$, $S_{5c}$, and $S_{5H}$ described above. The 5-angle equation is then exercised using 3-angle tolerance values in place of the 5-angle tolerance values. The neural network empirical model is configured such that the 3-angle tolerance values for each standard color at each of the 3 color measurement angles is about the same as the 5-angle tolerance values for the same standard color at each of the 3 color measurement angles. The difference in the 3-angle color difference value and the 5-angle color difference value for a given standard color–test color pair results from the use of different color measurement angles in equations (B), (C), and (D) above for the tolerance values, and not from a difference in the 5-angle equation (A). Therefore, if the 3-angle tolerance values, as produced by the neural network empirical model, are about the same as the 5-angle tolerance values, the 3-angle color difference value will be about the same as the 5-angle color difference value.

The neural network empirical model approximates the 3-angle tolerance values, as mentioned above. This is designed such that the 5-angle equation produces a 3-angle color difference value that is about the same as the 5-angle color difference value when exercising the 5-angle equation with either (a) 5-angle color measurements for a standard color–test color pair using the 5-angle tolerance values $S_{5L}$, $S_{5c}$, and $S_{5H}$ described above, or (b) 3-angle color measurements for the same standard color–test color pair using the 3-angle tolerance values $S_{3L}$, $S_{3C}$, and $S_{3H}$ calculated by the neural network empirical model.

Accuracy of the neural network empirical model may be determined by a tolerance value difference, where the tolerance value difference is a difference between the 5-angle tolerance value and the 3-angle tolerance value for each 3-angle measurement angle of each standard color. Ideally, the tolerance value difference is zero, but experimental data typically includes some variation. As such, a standard deviation of the tolerance value difference provides a good measurement of the accuracy of the approximation made by the neural network empirical model. In an exemplary embodiment, the standard deviation of the tolerance value difference for a plurality of standard colors is about 0.1 or less, but in an alternate embodiment the standard deviation of the tolerance value difference is about 0.07 or less. The standard deviation of the tolerance values may use a statistically significant number of sample data points, such as about 30 data points or more.

The term "about the same," as used herein in reference to results from either the neural network empirical model or the 5-angle equation, means the tolerance value difference for a plurality of standard colors (i.e., for about 30 or more different standard colors) is about 0.1 or less.

The neural network empirical model is established with a plurality of input nodes, a plurality of hidden nodes, and a plurality of output nodes. Each of the input nodes is connected to one or more hidden nodes, and each of the hidden nodes is connected to one or more output nodes. In an exemplary embodiment, each input node is connected to each and every hidden node, and each hidden node is connected to each and every output node. the input nodes accept 3-angle color measurements, and the output nodes produce 3-angle tolerance values $S_{3L}$, $S_{3C}$, and $S_{3H}$. The plurality of input nodes may be referred to as an "input layer," the plurality of output nodes may be referred to as an "output layer," and the plurality of hidden nodes may be referred to as a "hidden layer." In some embodiments, a plurality of hidden nodes in one hidden layer may be connected to a plurality of hidden nodes in a separate hidden layer, so it is possible to have one, two, or more hidden layers. This description generally refers to a model with one hidden layer, unless otherwise specified. Both the input layer and the hidden layer of the neural network empirical model may also contain one or more bias nodes. The bias node(s) are connected to every node in a subsequent layer, but are not connected to any nodes from a previous layer. The bias nodes of the hidden layer are also not connected to any of the hidden nodes within that hidden layer. In an exemplary embodiment, the input data and output data are scaled prior to model training or using the model for prediction. Typical scaling embodiments involve scaling the data to a minimum of 0 and maximum of 1, or a minimum of 0.1 and maximum of 0.9, or to a mean of 0 and a standard deviation of 1.

As an example, a scaling equation (E) to scale the data to an arbitrary minimum and maximum value, such as 0.1 and 0.9, respectively, may be:

output scaled value (X)=(scaled max−scaled min)·
(measured value−measured min)/(measured
max−measured min)+scaled min.  (E)

So, scaling to a range of from 0.1 to 0.9 for an input H* color measurement of 5, where the maximum H* color measurement is 10 and the minimum H* color measurement is 3, the calculation is:

output scaled value=((0.9−0.1)·(5−3))/(10−3)+0.1 output scaled value=(0.8·2)/7+0.1 output scaled value~0.33.

In an exemplary embodiment, the neural network empirical model originally generates the 3-angle tolerance values $S_{3L}$, $S_{3C}$, and $S_{3H}$ in a scaled range, such as a minimum of 0 and a maximum of 1, or a mean 0 with a standard deviation 1. These values may be "unscaled" to a physically meaningful range in a similar manner to the scaling process described above. The minimum and maximum 5-angle tolerance values are the minimum and maximum 5-angle tolerance values from the standard colors used to train the neural network empirical model, as described below. As such, the 3-angle tolerance values output by the neural network empirical model will generally range from about the minimum 5-angle tolerance value and the maximum 5-angle tolerance value determined from the set of standard colors used to train the neural network empirical model.

The functional form of a single layer neural network (with one hidden layer of nodes) may be represented as:

$$Y = f_{i+1}(f_i(X \cdot W_i + b_i) \cdot W_{i+1} + b_{i+1}), \quad (F)$$

where W and b are weights and biases for the model, respectively, "i" indicates the hidden layer of the network, and "i+1" indicates the output layer of the network. The terms "$f_i$" and "$f_{i+1}$" are activation functions that apply a transform, either linear or nonlinear, to each element of the network. Alternate equations representing different network structures may be utilized in alternate embodiments.

The weights and biases (W and b in the example above) may then be determined by entering training data into the neural network empirical model in a training phase. The training data includes at least: 3-angle standard color measurement data for a standard color; and 5-angle tolerance values (i.e., $S_{5L}$, $S_{5C}$, and $S_{5H}$) from equations (B), (C), and (D) described above, where the 5-angle tolerance values are calculated using 5-angle measurement data for the same standard color. This training may be exercised many times for a plurality of different standard colors, so the weights and biases (W and b in the example above, but other constants may be determined in alternate embodiments) are determined and set for the neural network empirical model.

The neural network empirical model may then be exercised with 3-angle color measurement data for a plurality of verification standard colors that are different than the plurality of standard colors used to train the neural network, empirical model. The neural network empirical model is exercised with 3-color standard color measurement data from the plurality of verification standard colors to verify the 3-angle tolerance value results closely approximate 5-angle tolerance values for the same plurality of verification standard colors.

It is possible to establish and utilize the neural network empirical model in a variety of manners. For example, the 3-angle input data includes 3-angle color measurement data, but several different possible variations exist. For example, in one embodiment the 3-angles for color measurement are 15 degrees (15°), 45°, and 110°. However, in an alternate embodiment, the 3-angles for color measurement are 25°, 45°, and 110°. Other angles could be utilized in yet other embodiments, and it is possible to use 2, 4, 6, 7, or more angles in yet other embodiments. In an exemplary embodiment, at least 2 different neural network empirical models are produced, including one for 15°, 45°, and 110° color measurements, and one for 25°, 45°, and 110° color measurements. The 5-angles used for the AUDI® 2000 Color Difference 5-angle equation are 15°, 25°, 45°, 75°, and 110°, so the angles utilized in the two different 3-angle neural network empirical models mentioned above are subsets of the angles used in the AUDI® 2000 Color Difference 5-angle equation.

In an exemplary embodiment, the 3-angle input data includes: (1) lightness (L*) from black (0) to white (+) at each of the 3-angles, (2) a* from green (−) to red (+) at each of the 3-angles; (3) b* from blue (−) to yellow (+) at each of the 3-angles; (4) chroma (C*) at each of the 3-angles; and (5) a single flop index for all the angles, making a total of 13 input nodes. However, in alternate embodiments the 3-angle input data may not include a flop index, and it may not include a chroma (C*) value at any of the angles. It is also possible to use alternate color values, including but not limited to the L*, C*, h* color space instead of the L*, a*, b* color space. Other possible color space measurement techniques are also possible.

In an exemplary embodiment, the 3-angle neural network empirical model includes 25 hidden nodes and a bias node in a single layer, where each hidden node is connected to each input node, including an input bias node, and each hidden node is connected to each output node. The use of 25 hidden nodes in a single hidden layer has produced accurate test results. However, in alternate embodiments, either more or less than 25 hidden nodes may be used. In other embodiments, the 3-angle neural network empirical model may include 2 or more hidden node layers. Accuracy may increase by the use of additional hidden nodes, or additional hidden layers, but the training process for the 3-angle neural network empirical model may be further complicated such that accurate results are more difficult to obtain.

EXAMPLES

Figure 2:
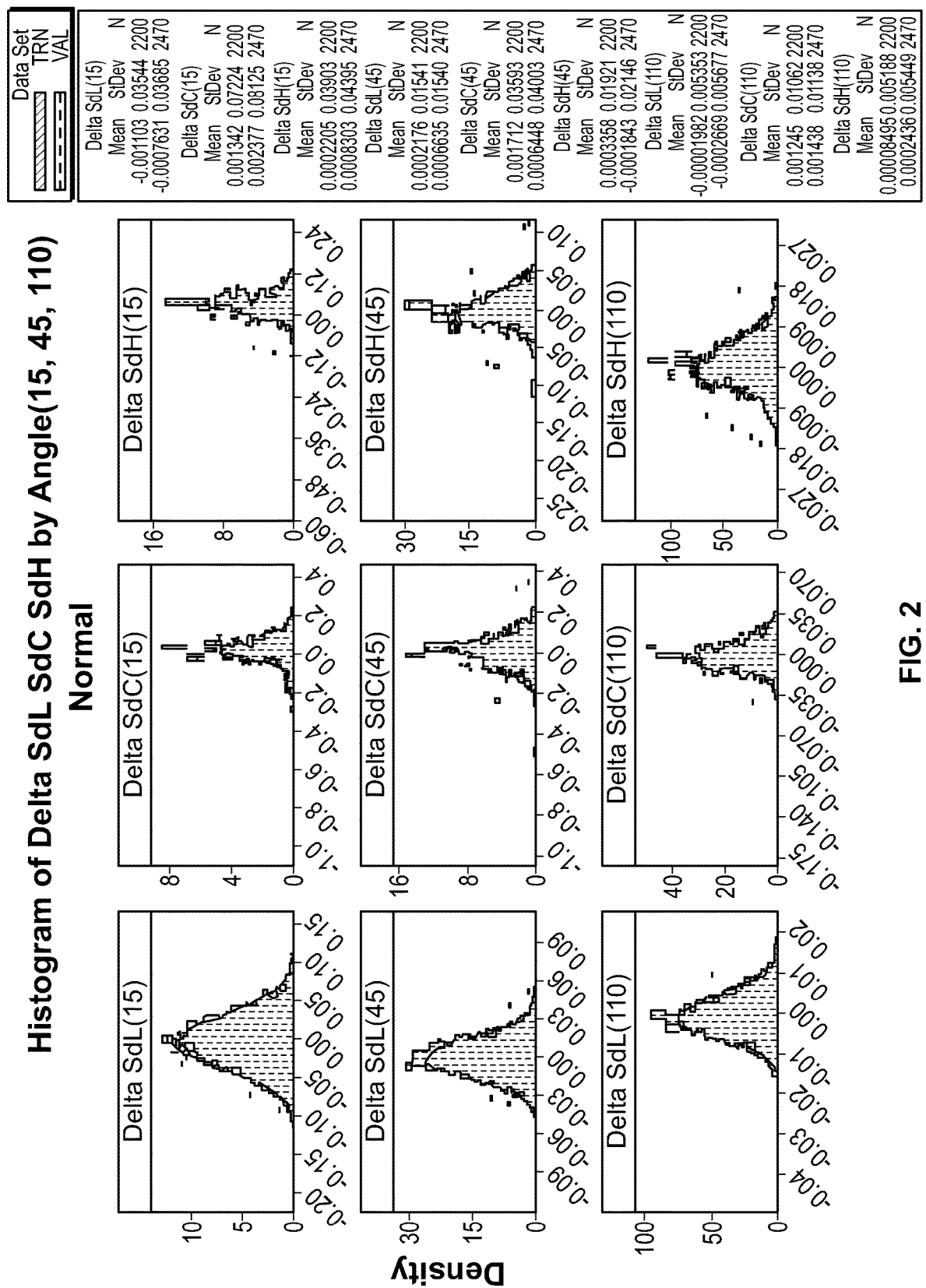
FIG. 2 is a histogram of training data and validation data for an exemplary neural network empirical model using color measurement angles of 15°, 45°, and 110°.
Figure 4:
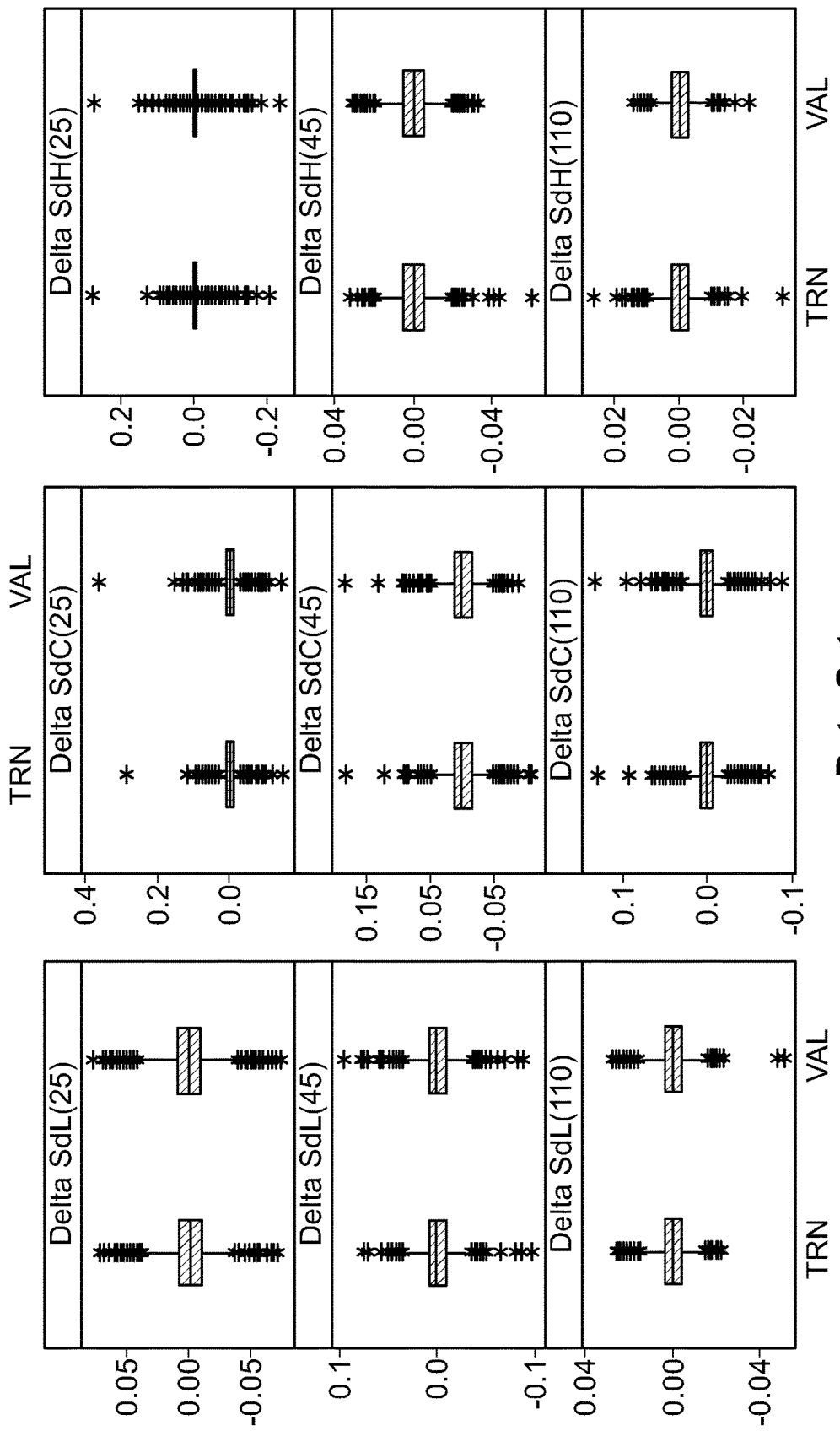
FIG. 4 is a boxplot of training data and validation data for an exemplary neural network empirical model using color measurement angles of 25°, 45°, and 110°.
Figure 5:
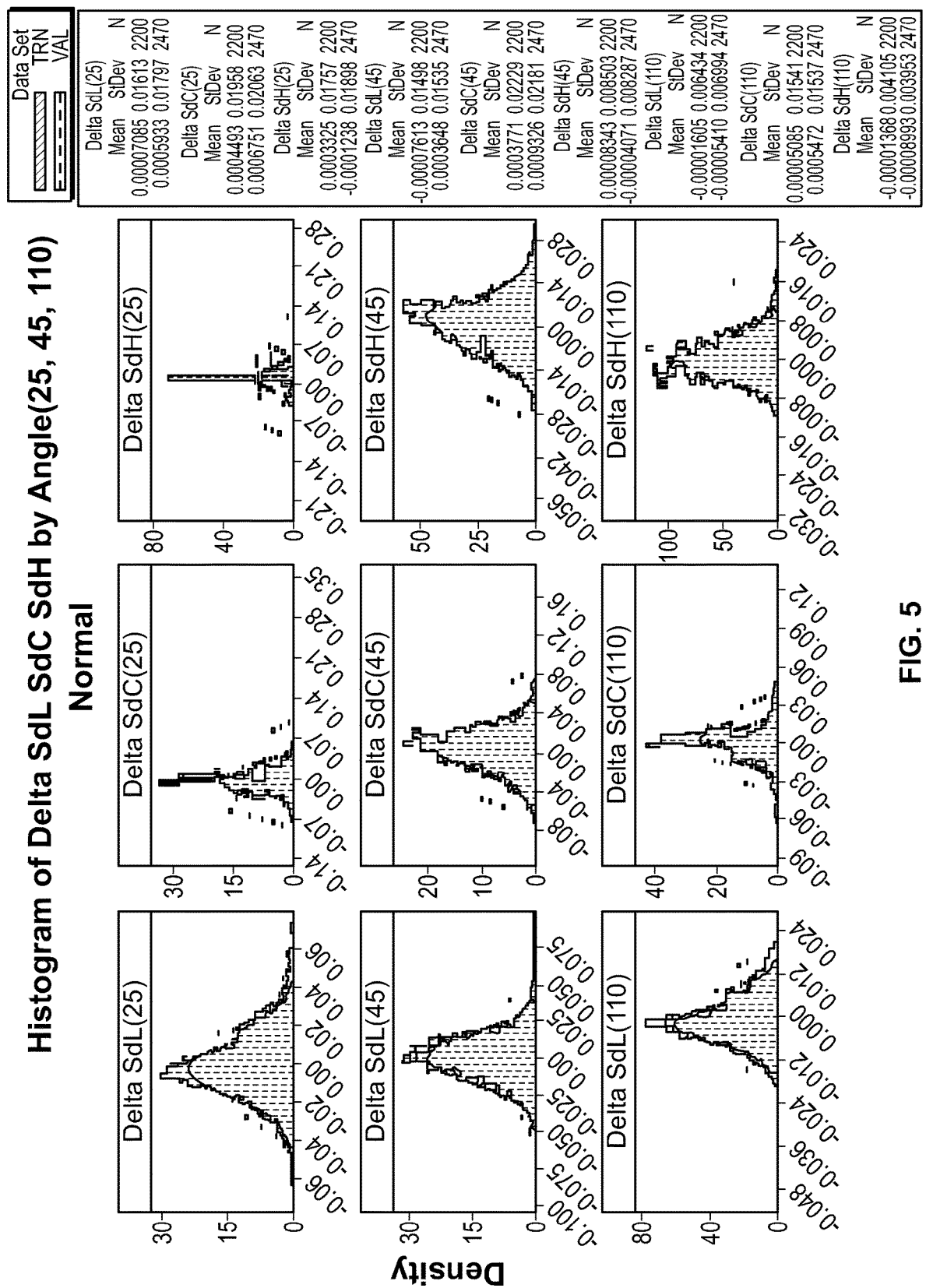
FIG. 5 is a histogram of training data and validation data for an exemplary neural network empirical model using color measurement angles of 25°, 45°, and 110°.

Two different 3-angle neural network empirical models were developed, one for 15°, 45°, and 110° measurement angles, and the other one for 25°, 45°, and 110° measurement angles. Each of the 3-angle neural network empirical models included 13 input nodes, 25 hidden nodes, and 9 output nodes, as described above. Each of the 3-angle neural network empirical models were trained with data from 2,200 known standard colors, using the techniques described above. The performance of both of the 3-angle neural network empirical models was validated with known data from 2,470 verification standard colors that were different than the standard colors used to train the neural network empirical model. The training data is referred to by the letters TRN in FIGS. 1-6, and the validation data is referred to by the letters VAL in FIGS. 1-6. Referring to FIGS. 1-6, the output results of 3-angle tolerance values, i.e., $S_{3L}$, $S_{3C}$, and $S_{3H}$, are represented with the measurement angle indicated in brackets in a subscript, and the number "3" removed from the subscript for the sake of simplicity. The data is labeled with a "d" in the subscript to indicate the results are the difference between (1) the 3-angle tolerance value at a specific angle, and (2) the 5-angle tolerance values at the same specific angle, for the same standard color. Therefore, a value of "0" means the calculated 3-angle tolerance value is exactly the same as the calculated 5-angle tolerance value, so the closer the values are to zero, the more accurate the 3-angle neural network empirical model. As can be seen, the difference in the TRN values and the VAL values is relatively small, indicating that the results from the 3-angle neural network empirical models will closely approximate results from the 5-angle AUDI® the 2000 Color Difference Equation While at least one embodiment has been presented in the foregoing detailed description, it should be appreciated that a vast number of variations exist. It should also be appreciated that the embodiment or embodiments are only examples, and are not intended to limit the scope, applicability, or configuration in any way. Rather, the foregoing detailed description will provide those skilled in the art with a convenient road map for implementing an embodiment, it being understood that various changes may be made in the function and arrangement of elements described in an embodiment without departing from the scope as set forth in the appended claims and their legal equivalents.

What is claimed is:

1. A processor-implemented apparatus for approximating a 5-angle color difference model, the apparatus comprising:

a storage device for storing instructions for approximation of the 5-angle color difference model, wherein the 5-angle color difference model comprises a 5-angle equation (A), wherein the 5-angle equation (A) is;

$$dE_{\Upsilon i} = \text{the square root of } ((dL^*_{\Upsilon i}/k_L \cdot S_{5L,\Upsilon i})^2 + (dC^*_{\Upsilon i}/k_c \cdot S_{5c,\Upsilon i})^2 + (dH^*_{\Upsilon i}/k_H \cdot S_{5H,\Upsilon i})^2), \quad (A)$$

wherein $dE_{\Upsilon i}$ is a 5-angle color difference value, $dL^*$ is a difference in a lightness between a standard color–test color pair, $\Upsilon$ is a measurement angle, i is an iteration of the measurement angle, $dC^*$ is a difference in a chroma between the standard color–test color pair, $dH^*$ is a difference in a hue between the standard color–test color pair, $K_L$, $K_c$, and $K_H$ are acceptance limits, $S_{5L}$, $S_{5c}$, and $S_{5H}$ are 5-angle tolerance values for the lightness, the chroma, and the hue, respectively at a particular color position; and one or more data processors configured to execute the instructions to:
receive a 3-angle standard color measurement of a standard color at each of 3 color measurement angles;
receive a 3-angle test color measurement of a test color at each of the 3 color measurement angles;
enter one of: (i) the 3-angle standard color measurement; or (ii) a geometric mean of the lightness L* and chroma C* of the standard color measurement and the test color measurement; into a neural network empirical model comprising a plurality of input nodes, a plurality of hidden nodes connected to the plurality of input nodes, and a plurality of output nodes connected to the hidden nodes, wherein the neural network empirical model is configured to output 3-angle tolerance values $S_{3L}$, $S_{3c}$, and $S_{3H}$ for each of the 3 color measurement angles; and
calculate a 3-angle color difference value for at least one of the 3 color measurement angles using the 5-angle equation (A) with the 3-angle standard color measurements, the 3-angle test color measurements, and the 3-angle tolerance values, wherein the 3-angle tolerance values are utilized in place of the 5-angle tolerance values in the 5-angle equation (A).

2. The apparatus of claim 1 wherein:
the 5-angle tolerance values $S_{5L}$, $S_{5c}$, and $S_{5H}$ are calculated by equations (B), (C), and (D), $$S_{5L,\Upsilon i} = 1.000 \cdot ((|L^*_{\Upsilon i} - L^*_{\Upsilon i+1}|)/(\Upsilon_{i+1} - \Upsilon_i))^{2/3} + 0.002 \cdot C^*_{45} + 0.33; \quad (B)$$

$$S_{5c,\Upsilon i} = 1.478 \cdot ((|C^*_{\Upsilon i} - C^*_{\Upsilon i-1}|)/(\Upsilon_{i+1} - \Upsilon_i)) + 0.014 \cdot C^*_{45} + 0.27; \quad (C)$$

and $$S_{5H,\Upsilon i} = 0.800 \cdot ((|C^*_{\Upsilon i} - C^*_{\Upsilon i+1}|)/(\Upsilon_{i+1} - \Upsilon_i)) + 0.004 \cdot C^*_{45} + 0.30; \quad (D)$$

wherein where L*, C* and H* are the lightness, the chroma, and the hue of the standard color, and where $C^*_{45}$ is the chroma of the standard color measured at 45 degrees.

3. The apparatus of claim 2 wherein a standard deviation of a tolerance value difference for a plurality of standard colors is about 0.1 or less, wherein the tolerance value difference is a difference between the 5-angle tolerance value and the 3-angle tolerance value for each 3-angle measurement angle of each standard color.

4. The apparatus of claim 1 wherein the input nodes of the neural network empirical model comprise a lightness node (L*), a red-green color node (a*), and a blue-yellow color node (b*).

5. The apparatus of claim 1 wherein the neural network empirical model comprises 13 input nodes, 25 hidden nodes, and 9 output nodes.

6. The apparatus of claim 5 wherein the 13 input nodes comprise an input node L* for each of the 3 color measurement angles, an input node a* for each of the 3 color measurement angles, an input node b* for each of the 3 color measurement angles, a chroma input node (C*) for each of the 3 color measurement angles, and a flop index.

7. The apparatus of claim 6 wherein a functional form of a single layer neural network is $Y = f_{i+1}(f_i(X \cdot W_i + b_i) \cdot W_{i+1} + b_{i+1})$, wherein W and b are a weight and a bias, respectively, for the model.

8. The apparatus of claim 7, wherein the 3-angle standard color measurements and the 3-angle test color measurements are scaled to a range of from 0.1 to 0.9 prior to exercising the neural network empirical model, such that a minimum value for each 3-angle test color measurement is scaled to 0.1 and a maximum value for each 3-angle test color measurement is scaled to 0.9.

9. The apparatus of claim 1 wherein the 3 color measurement angles are 15°, 45°, and 110°.

10. The apparatus of claim 1 wherein the 3 color measurement angles are 25°, 45°, and 110°.

11. A method of approximating a 5-angle color difference model with 3-angle measurements data, the method comprising the steps of:
receiving a 3-angle standard color measurement of a standard color at each of 3 color measurement angles;
receiving a 3-angle test color measurement of a test color at each of the 3 color measurement angles;
entering one of: (i) the 3-angle standard color measurement; or (ii) a geometric mean of the lightness L* and chroma C* of the standard color measurement and the test color measurement; into a neural network empirical model comprising a plurality of input nodes, a plurality of hidden nodes connected to the plurality of input nodes, and a plurality of output nodes connected to the plurality of hidden nodes;
outputting 3-angle tolerance values $S_{3L}$, $S_{3c}$, and $S_{3H}$ at each of the 3 color measurement angles from the neural network empirical model; and
calculate a 3-angle color difference value for at least one of the 3 color measurement angles using a 5-angle equation (A) with the 3-angle standard color measurements, the 3-angle test color measurements, and the 3-angle tolerance values $S_{3L}$, $S_{3c}$, and $S_{3H}$, in place of 5-angle tolerance values $S_{5L}$, $S_{5c}$, and $S_{5H}$, wherein the 5-angle equation (A) is;

$$dE_{\Upsilon i} = \text{the square root of } ((dL^*_{\Upsilon i}/k_L \cdot S_{5L,\Upsilon i})^2 + (dC^*_{\Upsilon i}/k_c \cdot S_{5c,\Upsilon i})^2 + (dH^*_{\Upsilon i}/k_H \cdot S_{5H,\Upsilon i})^2), \quad (A)$$

wherein $dE_{\Upsilon i}$ is a 5-angle color difference value, $dL^*$ is a difference in a lightness between a standard color–test color pair, $\Upsilon$ is a measurement angle, i is an iteration of the measurement angle, $dC^*$ is a difference in a chroma between the standard color–test color pair, $dH^*$ is a difference in a hue between the standard color–test color pair, $K_L$, $K_c$, and $K_H$ are acceptance limits, $S_{5L}$, $S_{5c}$, and $S_{5H}$ are 5-angle tolerance values for the lightness, the chroma, and the hue, respectively.

12. The method of claim 11 further comprising:
scaling the 3-angle standard color measurement and the 3-angle test color measurement to a range of from 0.1 to 0.9.

13. The method of claim 11 wherein:
receiving the 3-angle standard color measurement comprises receiving the 3-angle standard color measurement wherein the 3-angle standard color measurement is measured at 3 color test angles of 15°, 45°, and 110°.

14. The method of claim 13 wherein approximating the 5-angle color difference model comprises approximating the 5-angle color difference model wherein the 5-angle color difference model uses 5 color measurement angles of 15°, 25°, 45°, 75°, and 110°.

15. A method of producing a 3-angle color difference model that approximates a 5-angle color difference model, the method comprising the steps of:
receiving a 5-angle standard color measurement of a standard color at each of 5 color measurement angles;
calculating a plurality of 5-angle tolerance values $S_{5L}$, $S_{5C}$, and $S_{5H}$ using equations (B), (C), and (D), $$S_{5L\Upsilon i} = 1.000 \cdot ((|L^*_{\Upsilon i} - L^*_{\Upsilon i+1}|)/(\Upsilon_{i+1} - \Upsilon_i))^{2/3} + 0.002 \cdot C^*_{45} + 0.33; \quad (B)$$

$$S_{5C\Upsilon i} = 1.478 \cdot ((|C^*_{\Upsilon i} - C^*_{\Upsilon i-1}|)/(\Upsilon_{i+1} - \Upsilon_i)) + 0.014 \cdot C^*_{45} + 0.27; \quad (C)$$

and $$S_{5H\Upsilon i} = 0.800 \cdot ((|C^*_{\Upsilon i} - C^*_{\Upsilon i-1}|)/(\Upsilon_{i+1} - \Upsilon_i)) + 0.004 \cdot C^*_{45} + 0.30; \quad (D)$$

wherein where $L^*$, $C^*$ and $H^*$ are a lightness, a chroma, and a hue, $\Upsilon$ is a measurement angle, i is an iteration of the measurement angle, and where $C^*_{45}$ is the chroma of the standard color measured at 45 degrees;
receiving a 3-angle standard color measurement of the standard color at each of 3 color measurement angles, wherein the 3 color measurement angles are a subset of the 5 color measurement angles;
producing a neural network empirical model comprising a plurality of input nodes, a plurality of hidden nodes connected to the plurality of input nodes, and a plurality of output nodes connected to the plurality of hidden nodes, wherein the neural network empirical model is configured to output 3-angle tolerance values $S_{3L}$, $S_{3C}$, and $S_{3H}$ at each of the 3 color measurement angles;
training the neural network empirical model with (1) the 5-angle standard color measurement, (2) the 3-angle standard color measurement, and (3) the 5-angle tolerance values such that the 3-angle tolerance values output by the neural network empirical model are about the same as the 5-angle tolerance values at each of the 3 color measurement angles.

16. The method of claim 15 wherein:
training the neural network empirical model comprises training the neural network empirical model with a plurality standard colors such that a standard deviation of a tolerance value difference for the plurality of standard colors is about 0.1 or less, wherein the tolerance value difference is a difference between the 5-angle tolerance value and the 3-angle tolerance value for each 3-angle measurement angle of each standard color.

17. The method of claim 16 wherein training the neural network empirical model comprises:
calculating a plurality of weights and biases for the neural network empirical model such that the weights and biases of the neural network empirical model the standard deviation of the tolerance value differences for the plurality of standard colors of about 0.1 or less.

18. The method of claim 15 wherein:
receiving the plurality of 5-angle color difference values at each of the 5 color measurement angles comprises receiving the plurality of 5-angle color difference values at each of the 5 color measurement angles wherein the 5 color measurement angles are 15°, 25°, 45°, 75°, and 110°.

19. The method of claim 18 wherein:
receiving the plurality of 3-angle standard color measurements and the plurality 3-angle test color measurements for the standard color-test color pair at each of the 3 color measurement angles comprises using the 3 color measurement angles of 15°, 45°, and 110°.

20. The method of claim 18 wherein:
receiving the plurality of 3-angle standard color measurements and the plurality 3-angle test color measurements for the standard color-test color pair at each of the 3 color measurement angles comprises using the 3 color measurement angles of 25°, 45°, and 110°.

* * * * *